United States Patent [19]
Wright et al.

[11] Patent Number: 5,662,046
[45] Date of Patent: Sep. 2, 1997

[54] METHOD AND APPARATUS FOR CONTROLLING RAILWAY TRUCK HUNTING AND A RAILWAY CAR BODY SUPPORTED THEREBY

[75] Inventors: James F. Wright, Washington; Aubra D. McKisic, Coraopolis, both of Pa.

[73] Assignee: Hansen Inc., Pittsburgh, Pa.

[21] Appl. No.: 469,567

[22] Filed: Jun. 6, 1995

Related U.S. Application Data

[63] Continuation-in-part of Ser. No. 167,284, Dec. 14, 1993, abandoned.

[51] Int. Cl.$^6$ .................................................... B61F 5/38
[52] U.S. Cl. ................... 105/167; 105/198.3; 105/199.1; 105/200; 188/312; 188/322.15; 188/322.22
[58] Field of Search ............................ 105/165, 168, 105/198.3, 199.1, 200; 280/81.6, 136, 693, 698, 709, 714; 188/289, 312, 313, 317, 318, 322.15, 322.22

[56] References Cited

U.S. PATENT DOCUMENTS

| | | | |
|---|---|---|---|
| 3,376,831 | 4/1968 | Eaton et al. | 105/199.1 |
| 3,719,153 | 3/1973 | Schumacher | 105/199.1 |
| 4,023,689 | 5/1977 | Taylor | 214/17 |
| 4,090,723 | 5/1978 | Hart | 280/6 |
| 4,105,193 | 8/1978 | Long | 267/100 |
| 4,108,010 | 8/1978 | Taylor | 74/100 |
| 4,109,767 | 8/1978 | Nanoyal | 188/315 |
| 4,113,111 | 9/1978 | Theoren | 212/28 |
| 4,134,343 | 1/1979 | Jackson | 105/167 |
| 4,178,030 | 12/1979 | Dolinseic | 294/70 |
| 4,262,922 | 4/1981 | Nelson | 280/414 |
| 4,280,601 | 7/1981 | Patriquin | 188/316 |
| 4,300,454 | 11/1981 | Scheffel | 105/168 |
| 4,513,899 | 4/1985 | Ledgerwood | 226/141 |
| 4,580,710 | 4/1986 | Ledgerwood | 226/141 |
| 4,662,486 | 5/1987 | Stenberg | 188/312 |
| 4,673,068 | 6/1987 | De Bruijn | 188/315 |
| 4,899,855 | 2/1990 | De carson | 158/322 |
| 4,940,106 | 7/1990 | Pederson | 180/139 |
| 4,946,354 | 8/1990 | Aubry et al. | 416/158 |
| 5,042,625 | 8/1991 | Maus | 188/322.22 |
| 5,044,474 | 9/1991 | De Kock | 188/322.15 |
| 5,070,697 | 12/1991 | Van Zeggeren | 60/527 |
| 5,082,309 | 1/1992 | Schutzner | 280/714 |
| 5,271,485 | 12/1993 | Yowell et al. | 188/322.22 |
| 5,347,771 | 9/1994 | Kobori et al. | 188/312 |
| 5,507,475 | 4/1996 | Seel et al. | 188/322.15 |

FOREIGN PATENT DOCUMENTS

| 3209032 | 9/1991 | Japan | 188/322.15 |
|---|---|---|---|

*Primary Examiner*—S. Joseph Morano
*Attorney, Agent, or Firm*—J. Stewart Brams

[57] ABSTRACT

A method and apparatus for controlling relative movement such as rotary movement between a railway truck and a car body supported thereby to control truck hunting through application of reaction forces resisting such rotary movement which are effective primarily to resist higher velocity relative rotational movements.

11 Claims, 8 Drawing Sheets

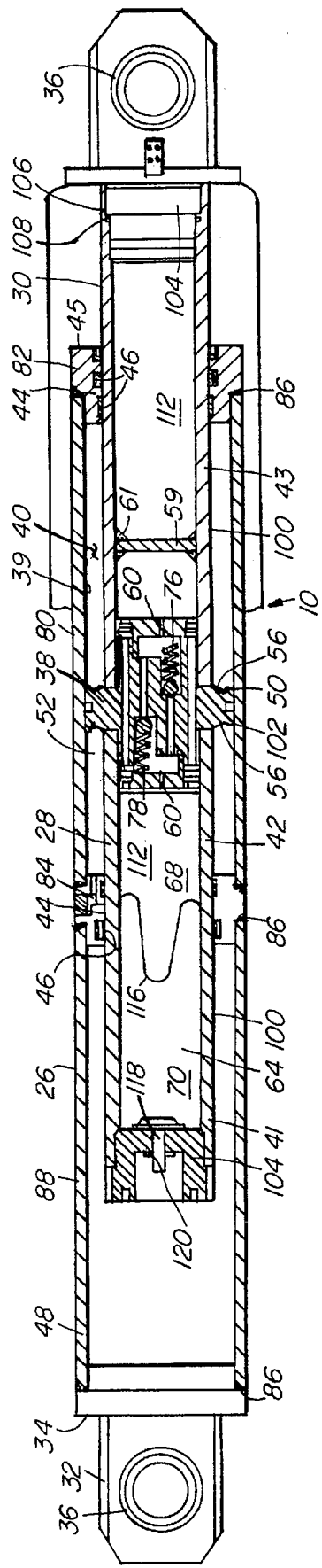
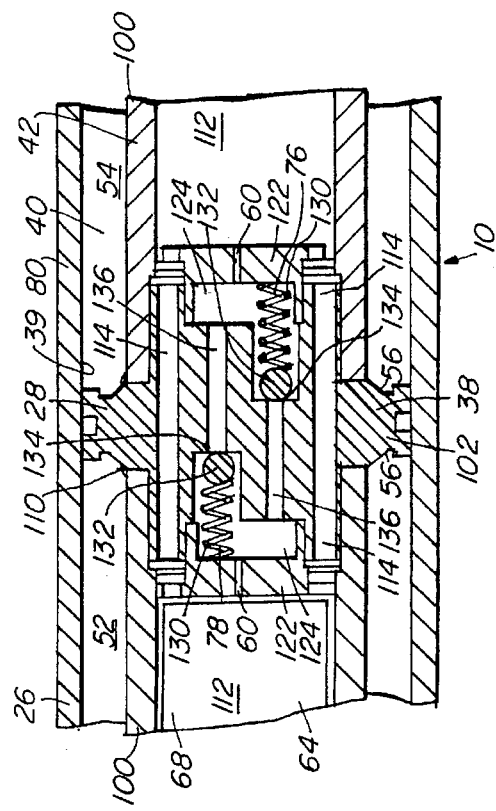
FIG. 3
FIG. 4

5,662,046

METHOD AND APPARATUS FOR CONTROLLING RAILWAY TRUCK HUNTING AND A RAILWAY CAR BODY SUPPORTED THEREBY

This is a continuation-in-part of application Ser. No. 08/167,284, filed Dec. 14, 1993, now abandoned.

BACKGROUND OF THE INVENTION

This invention concerns railway trucks generally and apparatus for controlling truck hunting responses by resisting the relative rotational impetus of a truck with respect to a car body supported thereby.

In conventional railway trucks such as three-piece trucks, hunting is an undesirable mode of truck movement along the railway track rails which is characterized by unstable cyclic yawing and lateral translation of the truck as it follows the truck wheelsets in the travel of their sinusoidal path of movement along the rails. As is well known, the truck wheelsets commonly will travel such a sinusoidal path in response to the contact forces developed by the interaction of the conical wheels with the cylindrical rail heads. A truck wheelset traveling its sinusoidal path moves transversely in cyclic fashion with respect to the rails. In doing so the wheelset both traverses laterally and yaws in a horizontal plane with respect to the rails.

With the advent of the roller bearing for railway trucks, lateral wheelset freedom with respect to the truck side frames was essentially eliminated and the side frames thus were constrained to follow the wheelsets in their cyclic lateral traversing and yawing movements. In response to this constraint the truck may yaw cyclically about a vertical axis with respect to the car body supported thereon and/or translate laterally with respect to the rails.

When such responses occur above a given critical rail car speed, the truck movements can degenerate into self-excited oscillation of the truck which is known as truck hunting. This can be destructive to the truck wheels and the rails as well as to other truck components, the car body and its lading due to the large magnitude impact loads sustained by all of these components. In the extreme, truck hunting can precipitate catastrophic failure of various affected components and result in derailment.

The art has continually sought to reduce the incidence of truck hunting by various means including the use of fluid and friction damping to dissipate the energy input which drives the hunting responses. For example, it is known that a controlled resistance to the relative rotational movement between a truck and a car body supported thereby can be effective to restrain truck hunting. One commonplace means for providing such resistance to relative truck rotation, the constant contact side bearing, typically includes a sliding contact member that is maintained in biased frictional engagement with a car body wear plate. Truck yaw with respect to the car body thus results in shearing movement between the side bearing contact member and the car body wear plate with resultant wheel-rail creep damping as well as sliding friction that dissipates a portion of the energy that drives the truck yawing movement.

Since a truck must yaw with respect to the car body supported thereon in normal operation, such as when the car traverses a track curve entry or exit spiral, it is preferable that the control of truck yaw with respect to the car body be maintained only for higher velocity rotational movements which would be characteristic of destructive truck hunting responses, and not for lower velocity truck yawing such as that encountered when the car negotiates a track curve. For this purpose, a yaw resistance of a magnitude that is related to truck yaw movement velocity is a desirable alternative or adjunct to a constant contact side bearing.

The present invention contemplates such an alternative in the form of a hydraulic yaw damper connected between a railway truck, for example the truck bolster, and a railway car body supported thereon. Although hydraulic dampers, and in particular elongated, selectively extensible piston and cylinder hydraulic dampers, are known in the railway arts, none so far as we are aware provides the improved structure or the method disclosed hereinbelow.

For example, U.S. Pat. No. 4,300,454 discloses a self-steering damping railway truck which includes a hydraulic damper for damping relative movement between the truck wheelsets. U.S. Pat. No. 4,134,343 discloses a railway truck having a hydraulic piston and cylinder assembly connected by links to brake shoes and utilized for application of braking force. U.S. Pat. No. 4,109,767 discloses a valve structure for a double acting shock absorber with a compression valve being mounted within a hollow valve stem of a replenishing valve. Other patents of pertinence to hydraulic shock absorbers and similar structures include U.S. Pat. Nos. 5,070,697, 5,044,474, 4,673,068, 5,082,309, 4,946,354, 4,940,106, 4,899,855, 4,580,710, 4,513,899, 4,280,601, 4,262,922, 4,178,030, 4,113,111, 4,108,010, 4,105,193, 4,090,723 and 4,023,689.

BRIEF SUMMARY OF THE INVENTION

The present invention provides improved method and apparatus for controlling the relative yawing movement of a railway truck about the centerplate vertical axis with respect to a car body supported thereon. The invention contemplates the application of yaw resistance between the railway truck and car body at a magnitude which is related, within limits, to the velocity of the relative truck yawing movement to thereby provide effective restraint only for higher velocity yawing movement. The yaw freedom of the truck with respect to the car body for lower velocity yawing such as occurs in negotiation of curved track remains substantially unrestrained by the apparatus of the invention.

In one embodiment of the invention an apparatus for restraining relative yawing between a railway truck and a car body includes an elongated hydraulic piston and cylinder assembly which provides variable volume closed chambers within the cylinder on opposed sides of a piston head, the closed chambers being interconnected by fluid flow passages having a pair of restricted flow orifices and a pressurized fluid reservoir and reserve volume between the restricted flow orifices. One side of each restricted flow orifice communicates with one of the closed chambers within the hydraulic cylinder on either side of the piston head and the other side of each restricted flow orifice communicates in common with the pressurized fluid reservoir.

In another embodiment of the invention, the above-described restricted flow orifice, fluid reservoir and reserve volume structure further includes pressure relief valves for permitting hydraulic fluid to bypass the restricted flow orifices and flow freely from one side of the piston head to the other whenever the pressure differential between the opposed sides of the piston head exceeds a predetermined maximum pressure. Such a pressure relief valve may be provided for fluid flow in each direction between the cylinder chambers to accommodate pressure relief irrespective of the direction of piston movement within the cylinder.

In a further embodiment of the invention, all of the flow control structure, including restricted flow orifices, fluid reservoir, reserve volume and pressure relief valves, is confined within the piston assembly which in turn is carried within the hydraulic cylinder such that the yaw damper is a compact apparatus having all its various components protected from exposure to the harsh operating environment of the railway truck.

The invention affords improved control of truck hunting responses by providing a resistance to higher velocity relative yawing movement between the truck and the car body at a resistance magnitude which is related to the velocity of relative yawing movement between the truck and car body such that higher velocity relative yawing moments result in greater yaw resistance.

It is therefore one object of the invention to provide an improved hydraulic damper.

Another object of the invention is to provide an improved apparatus for restraining relative yawing movement between a railway truck and a car body supported thereby.

A further object of the invention is to provide an improved method for controlling truck hunting responses in a railway truck.

These and other objects and further advantages of the invention will be more fully appreciated upon consideration of the following detailed description and the accompanying drawings, in which:

FIG. 3 is a detailed, sectioned side elevation of one preferred structure for a damper of this invention;

FIG. 4 is an enlarged fragmentary portion of FIG. 3.

The following description constitutes disclosure of both the method and the apparatus of the present invention. Any description hereinbelow in any way pertaining to operation of the apparatus is intended to be understood also as a description of the method, whether or not such description specifically refers to the method of our invention.

Figure 1:
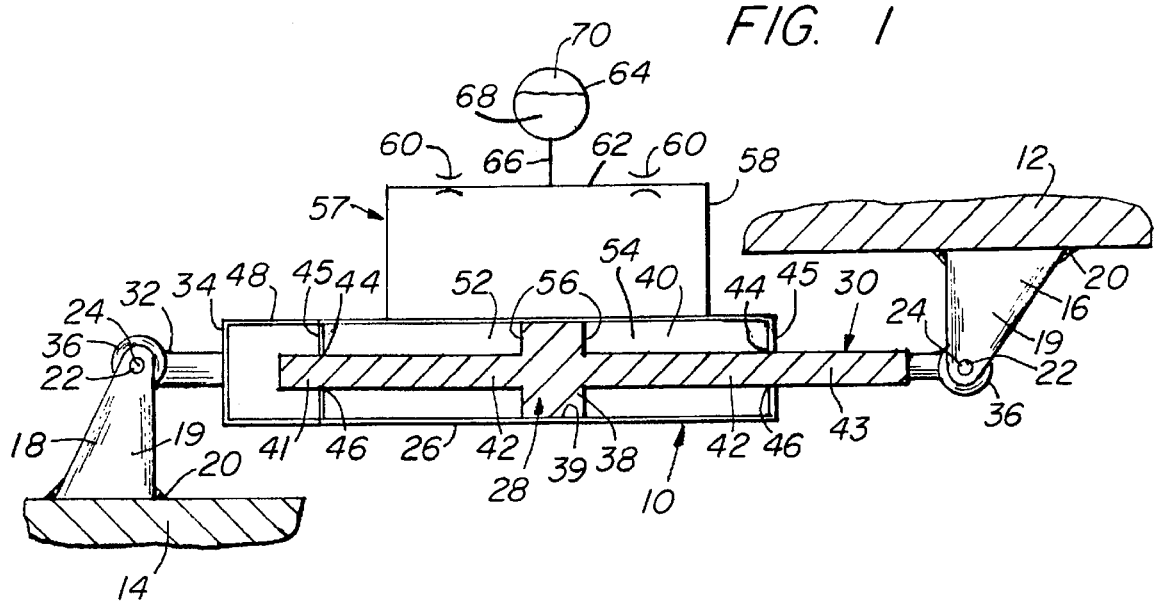
FIG. 1 is a generally schematic side elevation of a hydraulic yaw damper apparatus connected between a railway truck bolster and a car body in accordance with one presently preferred embodiment of the instant invention.

Referring to FIGS. 1, 3 and 4, there is generally indicated at 10 in FIG. 1 a hydraulic damper connected between a railway car body 12 and a railway truck bolster 14 which supports the car body 12 in the well known manner. Specifically, bolster 14 includes a conventional centerplate bearing (not shown) on which a cooperable bearing (also not shown) of car body 12 is pivotally supported. Bolster 14 may be the bolster of any conventional railway truck such as a three-piece truck of the type commonly used in freight haulage. As such, the truck may include other components of well known design not shown here, such as a pair of longitudinally spaced wheelsets with conical wheels and roller bearing axle extensions for support of a pair of side frames. The side frames in turn carry spring groups for sprung support of bolster 14.

Car body 12 may be supported not only by the above-mentioned centerplate bearing but in addition by such expedients as side bearings (not shown), for example conventional constant contact side bearings carried by bolster 14 laterally outboard of the bolster centerplate.

Car body 12 and bolster 14 include respective damper supports 16, 18 which are retained with respect to car body 12 and bolster 14, respectively, by such suitable means as weldments 20. Each of supports 16 and 18 may include, for example, a pair of spaced apart, generally triangular plate members 19 having mutually aligned openings 22 to receive and retain a retention member 24 extending therebetween. The retention members 24 capture and retain respective opposed end portions of damper 10 as described hereinbelow.

The damper 10 is a piston and cylinder assembly including a hydraulic cylinder 26 within which a piston assembly 28 is reciprocally disposed. The opposed end portions of the damper 10 which are retained with respect to supports 16 and 18 thus include, respectively, an axial end 30 of piston assembly 28, and an opposed axial end 32 of cylinder 26.

The supports 16 and 18 are suitably displaced or offset laterally from the centerplate bearing, which is the vertical axis of relative yaw movement between bolster 14 and car body 12, so that the line of action of the forces evolved through actuation of damper 10 can impart a moment to the bolster and car body combination to restrain relative yawing movement therebetween. Of course, to accommodate such relative yawing movement the retention members 24 and cooperating retained portions 36 of the piston and cylinder end portions 30 and 32, respectively, must accommodate sufficient mechanical freedom. Preferably, the retention of portions 30 and 32 by supports 18 and 16, respectively, will accommodate all relative rotational degrees of freedom, but no translational degrees of freedom. For example, retention members 24 and retained portions 36 may be interengaged through spherical bearing surfaces such as in a ball and socket connection.

As may be readily appreciated, with both of supports 16 and 18 positioned so that the line of action of damper 10 extending therebetween is offset laterally from the vertical yaw axis, relative yawing movement between car body 12 and bolster 14 will necessarily result in an increase or a decrease in the distance between the supports 16 and 18 thus actuating the damper 10, which is connected therebetween, to induce either extension or contraction of the damper assembly.

Of course, hydraulic dampers connected between a railway truck and car body for the purpose of restraining relative yawing movement therebetween as above described are known in the art. The above-described structural features thus form no part of the instant invention except insofar as the same are included in the claims hereinbelow in combination with other method and/or structure yet to be described.

As noted, damper 10 includes a hydraulic cylinder 26 and a piston assembly 28 reciprocally mounted therein. Piston assembly 28 includes a piston head 38 which is closely, slidably received within an axially elongated inner space or chamber 40 of cylinder 26. To guide piston head 38 in its reciprocal travel within space 40, the piston assembly 28 further includes an axially extending rod portion 42 which extends axially within space 40 and through openings 44 formed in opposed ends 45 of cylinder 26 located at the respective opposed ends of space 40. Seals 46 carried by cylinder ends 45 seal against the periphery of piston rod 42 to contain hydraulic fluid within space 40 while accommodating axial sliding movement of the piston rod 42 within openings 44 in conjunction with axial movement of the piston assembly 28 with respect to cylinder 26.

One end 43 of piston rod 42 projects outwardly of cylinder 26 to form the piston rod end portion 30 which is connected to support 16. The opposed end 41 of piston rod 42 extends axially through opening 44 at the other end of cylinder 26 and outwardly thereof, and preferably may be confined within an extended portion 48 of cylinder 26. Extension 32 is affixed to and projects beyond end portion 34 of cylinder extension 48 for connection to support 18 as hereinabove described.

Piston head portion 38 is maintained in closely slidable, sealed engagement about its periphery with the corresponding inner periphery 39 of space 40 to thereby divide space 40 into a pair of longitudinally adjacent chambers 52 and 54. As space 40 is of uniform diameter and the piston rod 42 extending in both axial directions from piston head 38 is of uniform cross sectional area, the piston areas 56 presented to chambers 52 and 54, respectively, are equal. Accordingly, on axial movement of piston head 38 in either axial direction by any given increment of axial distance, one of the chambers 52 and 54 will decrease in volume by a corresponding amount and the other of chambers 52 and 54 will increase in volume by the same amount. In order to accommodate such piston movement, a fluid flow circuit 57 is provided (FIG. 1) which includes a fluid flow conduit means 58 that communicates between chambers 52 and 54 to permit the passage of hydraulic fluid therebetween.

Since the purpose of damper 10 is to restrain relative rotational movements between bolster 14 and car body 12 as above described, relative axial movement of piston head 38 with respect to cylinder 26 must be restrained. Accordingly, restricted flow orifices 60 are provided at spaced locations in conduit 58 to restrict the flow of fluid between chambers 52 and 54. On initiation of piston head movement, a pressure differential is established across orifices 60, the higher pressure corresponding to the pressure developed in the one of chambers 52 and 54 toward which piston head 38 is moving, and the lower pressure corresponding to the pressure in other of chambers 52 and 54. Preferably, an intermediate pressure of a magnitude between the higher and lower pressure magnitudes as above specified is maintained within the portion 62 of conduit 58 extending between the orifices 60. A pressure accumulator 64 communicates via a conduit 66 with conduit portion 62 to contain a volume of hydraulic fluid 68 and a pressurized charge of gas 70 in order to maintain at least a predetermined minimum pressure in conduit portion 62.

In the damper apparatus 10, chambers 52 and 54, conduit 58 including conduit portion 62, conduit 66 and a contiguous portion of accumulator 64 are filled completely with hydraulic fluid at all times. Further, not only are chambers 52 and 54 preferably confronted by equal piston areas, conduit 58 is of uniform flow sustaining capability as is conduit 66, and orifices 60 are of such suitably similar flow characteristics that during actuation of the damper apparatus 10 the pressure drop across each of orifices 60 will be substantially equal. Accordingly, the proportion of the available volume within accumulator 64 occupied by the hydraulic fluid volume 68 remains essentially constant during operation of damper 10. Of course, the pressure of the gas 70 can vary for other reasons. For example, as is well known the pressure of a fixed volume of gas will vary directly with temperature. It will be noted, however, that variations in temperature and pressure of gas volume 70 generally will not change the pressure differential between chambers 52 and 54, nor accordingly the restraining force between end connections 36 resulting from a given relative movement therebetween and the corresponding movement of piston head 38 within cylinder space 40.

The pressure of gas 70 is transmitted to the hydraulic fluid mass 68 and throughout the fluid filled spaces of damper 10, and this static hydraulic fluid pressure is maintained so long as damper 10 remains unactuated. On actuation of the damper, piston head 38 will experience an impetus tending to move it in one axial direction or the other within space 40 against the resistance to fluid flow offered by orifices 60, thus increasing the fluid pressure in one of chambers 52 and 54 and decreasing the fluid pressure in the other. A fluid flow impetus from the higher pressure chamber to the lower pressure chamber thus is established. The higher fluid pressure is established at the upstream side of the orifice 60 connected to the higher pressure chamber 52 or 54, and the corresponding reduced pressure is established at the downstream side of the other orifice 60. These increased and diminished pressures are deviations from the static pressure which is maintained as above described by the pressure of gas 70.

The static pressure is maintained within conduit portion 62 between the orifices 60 so that a pressure drop from the higher imposed pressure to static pressure appears across one orifice 60, and a second pressure drop from static pressure to diminished pressure appears across the other orifice 60. The pressure drop across each of the orifices 60 corresponds to the restriction of fluid flow therethrough, and since the orifices exhibit generally equivalent flow characteristics, the flow rate through each of orifices 60 will be essentially the same. Accordingly, no fluid accumulation will occur in the fluid volume available between orifices 60, including accumulator 64, substantially no change in the volume of gas 70 will occur, and the static pressure thus will remain unchanged by movement of piston head 38 within cylinder 26 and the resulting fluid flows imposed as described within the system.

The pressure differentials resulting from restricted fluid flow through orifices 60 will restrain the movement of piston head 38, and thus will restrain the relative rotation between car body 12 and bolster 14 to thereby resist and reduce high velocity truck yawing with respect to the car body.

As noted, only high velocity yawing movement of the truck is of concern in dealing with truck hunting responses. Lower velocity or lower frequency cyclical yawing movement is not destructive and there appears no reason to restrain or control it. Indeed, as has been noted truck yaw freedom with respect to the car body is essential in normal operation such as when a car traverses track curve entry or exit spirals. Accordingly, the damper apparatus of this invention is sensitive to yaw movement velocity. Low velocity yawing movement will produce proportionally smaller fluid flow rates through orifices 60, due to a lower pressure differential between chambers 52 and 54, than do higher velocity yawing movements. The flow restriction imposed by orifices 60 results in a greater pressure drop and greater yaw restraint for high velocity movement of piston head 38 within cylinder 26 than for lower velocity movement. Since the pressure differential between chambers 52 and 54 varies in direct relation with the velocity of piston movement, it also varies in direct relation with relative truck-to-car body relative rotation, although the relationship is not linear. Accordingly, the low velocity yaw movements necessary to normal truck operation under the car body would be essentially unrestrained by damper 10, but higher velocity yaw movements would be countered with increasingly higher levels of restraint.

Figure 2:
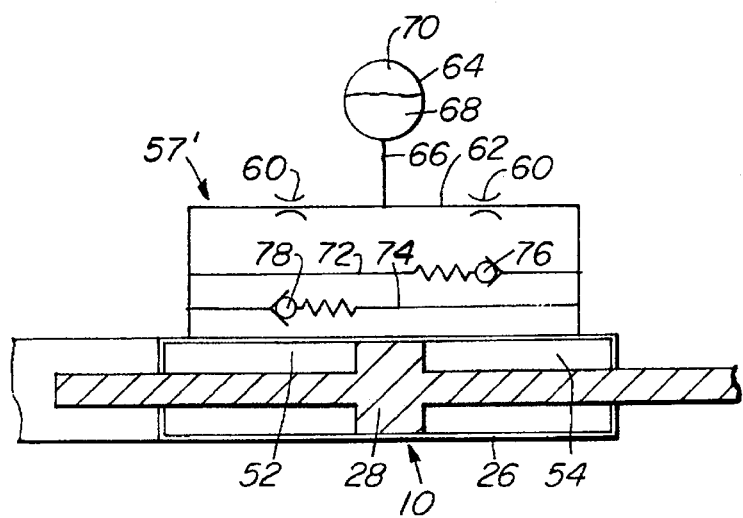
FIG. 2 is a fragmentary, generally schematic side elevation of a damper according to an alternative embodiment of the invention.

Referring to FIGS. 2, 3 and 4, an alternative embodiment of the invention is shown that is similar in all salient respects to the embodiment of FIG. 1; however, the FIG. 2 embodiment also includes two bypass conduits 72 and 74 in a modified fluid flow circuit 57' for allowing fluid flow between chambers 52 and 54 to bypass orifices 60. Bypass conduit 72 includes a pressure relief valve 76 which permits hydraulic fluid flow above its specified relief pressure to flow from chamber 54 to chamber 52 through conduit 72 thereby bypassing orifices 60. Similarly, conduit 74 includes a relief valve 78 which permits hydraulic fluid flow above its specified relief pressure to flow from chamber 52 to chamber 54 through conduit 74 thereby bypassing the orifices 60.

Bypass flow paths 72 and 74, and the corresponding relief valves 76 and 78 limit the maximum restraining force with which damper 10 is able to resist truck-to-car body relative yaw. Although the simplest form of the apparatus as shown in FIG. 1 would be ideal, the employment of relief valves as shown in FIGS. 2, 3 and 4 can be helpful in several respects. For example, with a sufficiently great diminishing of the pressure in one of the chambers 52 and 54 from the static pressure of gas 70, fluid cavitation can occur in the lower pressure chamber 52 or 54 with resulting unequal pressure drops through orifices 60 and, consequently, unequal flow. This may cause the fluid volume 68 to change with corresponding and undesired change in both the volume and the pressure of gas 70. Of course, one could merely increase the static pressure of gas 70 to a sufficient magnitude that a diminished pressure in either of chambers 52 and 54 would never exceed the higher static pressure in normal operation. This, however, would impose additional and unnecessary pressure loads on the piston rod seals and would in other ways unnecessarily burden the damper design.

By employing relief valves 76 and 78, a predetermined maximum total pressure drop between chambers 52 and 54 can be imposed on the system. As a result, whenever the maximum pressure drop is exceeded any excess fluid flow not immediately accommodated by orifices 60 will pass directly between the chambers 52 and 54 via the respective one of conduits 72 or 74, depending upon which of chambers 52 and 54 is experiencing higher pressure and which the lower pressure. Further, since the relief valves 76 and 78 will stay open only while the predetermined maximum pressure differential between chambers 52 and 54 is exceeded, fluid flow at this maximum pressure differential would continue through orifices 60 even while one of the relief valves 76 or 78 is open. The damper 10 thus will continue to dissipate the energy of higher velocity relative yawing movement between the truck and the car body even when one of the pressure relief valves 76 or 78 is open.

FIGS. 3 and 4 illustrate one preferred embodiment of the invention as has been partially described hereinabove with reference to these same Figures as well as FIGS. 1 and 2. Various elements called out by number in FIGS. 3 and 4 correspond to the elements bearing like numbers in FIGS. 1 and 2; however, one primary difference to be appreciated is that in the FIGS. 3 and 4 embodiment the accumulator 64 is carried within the confines of piston rod 42. As a result, the passageways connecting chambers 52 and 54 with each other and with accumulator 64, as well as the orifices 60 and relief valves 76 and 78, are all located within the confines of piston assembly 28. These and other elements so confined make up a pressure generating means and a pressure varying means which form a part of the described damper. As FIGS. 3 and 4 are much more detailed than FIGS. 1 and 2, many additional structural elements not described hereinabove with reference to FIGS. 1 and 2 are described hereinbelow.

Referring to FIGS. 3 and 4, cylinder 26 may preferably be a cylindrical member 80 of steel, for example, fitted with cylinder end members 82 and 84 which are retained with respect to cylinder 80 as by circumferential weldments 86. The cylinder ends 82 and 84 each include an opening 44 and seals 46 as above described to receive piston rod 42.

A rigid elongated cylindrical member 88, similar to cylindrical body 80, is coaxially fixed to cylinder end 84 and retained with respect thereto as by a circumferential weld 86. The cylinder extension 88 projects axially therefrom to a point beyond the furthest possible displacement of piston rod 42 through cylinder end 84. The cylinder extension end 34 is fitted to an outer open end of cylindrical extension member 88 and retained with respect thereto as by a circumferential weldment 86. The further extension member 32 is similarly fixed to extension end 34 and projects axially outward therefrom and includes the retention portion 36 as above described.

Piston assembly 28 includes a pair of coaxially arranged, rigid, cylindrical piston rod elements 100 which are affixed in coaxial relationship with respect to a rigid piston body member 102 so as to project in opposed axial directions from piston body member 102. End closure elements 104 are received within the respective outer open ends of the cylindrical rod members 100 and are sealingly engaged therein, for example by threaded engagement as indicated at 106. Suitable circumferential seals such as indicated at 108 extend circumferentially intermediate end closure elements 104 and the interior periphery of the respective rod elements 106 to provide a sealed interface therebetween. Rod elements 100 may be retained with respect to piston body 102 as by weldments as indicated at 110, or by threaded engagement, for example.

In the FIG. 3 and 4 embodiment, the entire structure of flow circuit 57' as shown schematically in FIG. 2 is contained within the confines of piston rod elements 100 and piston body 102. Specifically, the fluid accumulator 64 is contained within the inner volumes 112 of piston rod elements 100 between piston body 102 and the respective end closures 104. These two volumes 112 openly communicate with each other for free fluid flow therebetween via a plurality of longitudinally extending through bores 114 (FIG. 4) extending longitudinally within piston body 102. In order to permit the volume of fluid accumulator 64 to be minimized, consistent with its operating requirements, a partition 59 may be disposed within the one of piston rods not containing bladder 116. For example, the partition 59 may be comprised of a rigid circular plate member which is welded as indicated at 61 to the inner, cylindrical side wall of the corresponding piston rod. Minimizing the volume of fluid accumulator 64 provides several benefits including reduction of fluid use and diminished effects of fluid thermal expansion and contraction such as static pressure changes of gas 70.

The pressurized gas volume 70 preferably is contained within a flexible bladder 116 which is also disposed within the inner space or volume 112 of one piston rod element 100. A valve 118 is mounted in the corresponding end closure 104 and communicates with the interior of bladder 116. A stem 120 of valve 118 projects axially outwardly from the end closure 104 and is accessible for injecting compressed gas 70 into bladder 116.

Figure 7:
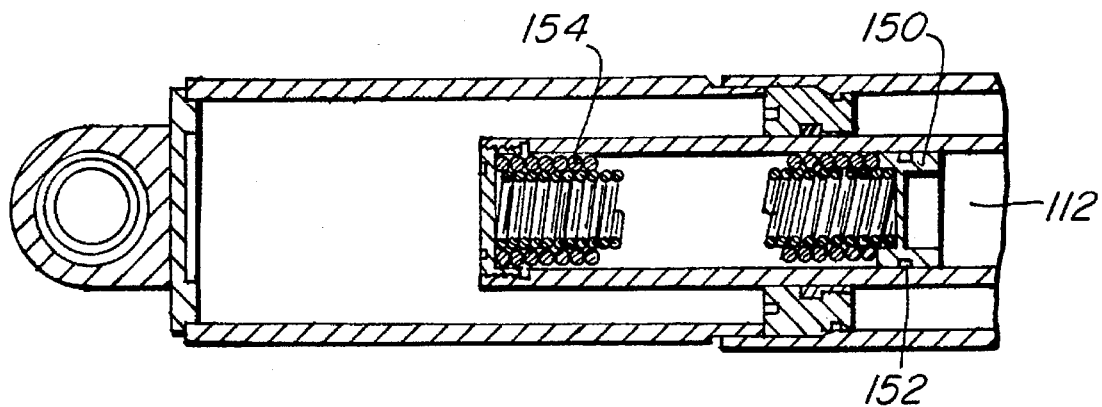
FIG. 7 is a sectioned side elevation of a fragmentary part of a damper showing an alternative preferred embodiment for a fluid pressure accumulator.

In lieu of the pressurized bladder, the fluid accumulator may alternatively be a spring loaded accumulator comprised of a piston 150 (FIG. 7) slidably disposed within space 112 of the corresponding piston rod and having a circumferential seal 152 for sealing engagement with the inner peripheral side wall of the piston rod. A spring 154 extends in biased engagement between the piston rod end closure and piston 150 carried therein to thereby apply a static pressure load to the accumulator fluid carried within space 112. Spring 154 may be a single rate spring, a variable rate spring, or multiple springs of differing spring rates as shown in FIG. 7.

The accumulator 64 of the FIG. 3 and 4 embodiment communicates directly with restricted flow orifices 60 carried by piston body 102. Specifically, orifices 60 are formed in orifice plate members 122 (FIG. 4) disposed within cooperating, coaxial recesses 124 formed in opposed axial ends of piston body 102. The direct communication between the accumulator reserve fluid space and the orifices 60 eliminates the need for the separate conduit sections 62 and 66 (FIGS. 1 and 2) to provide such communication.

Figure 5:
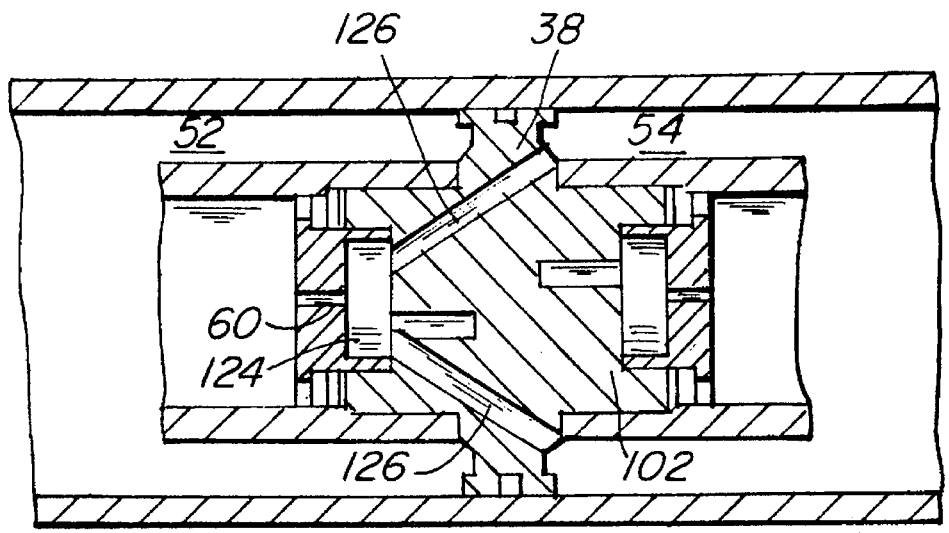
FIG. 5 is an enlarged, fragmentary section similar to FIG. 4 showing the piston head sectioned along a selected plane to show fluid passageways connecting the chamber at one side of the piston head to one restricted flow orifice.
Figure 6:
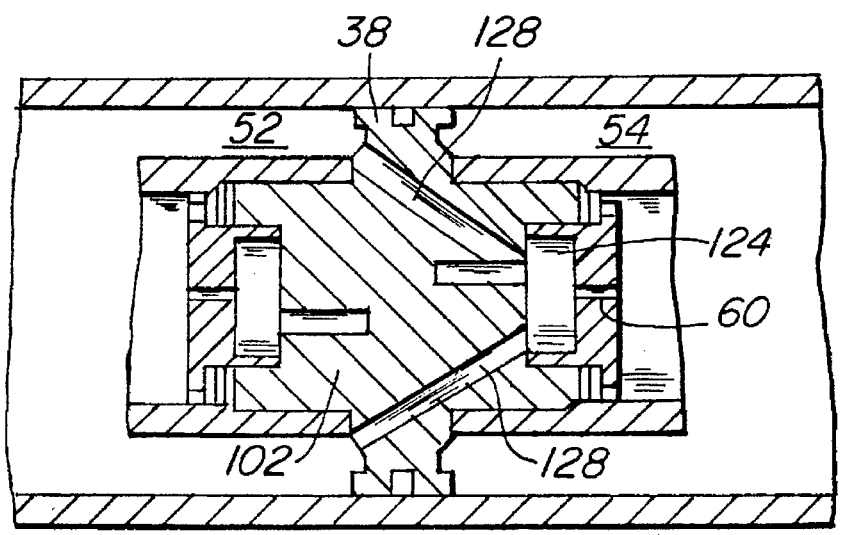
FIG. 6 is an enlarged, fragmentary section similar to FIG. 5 showing the piston head sectioned along a selected plane to show fluid passageways connecting the chamber at the other side of the piston head to the other restricted flow orifice.

Recesses 124, together with other passageways to be described hereinbelow, provide the fluid flow path for fluid communication from orifices 60 to the respective chambers 52 and 54 on either side of piston head 38, which preferably is an integral annular portion of piston body 102. Referring to FIGS. 1 and 5, the portion of conduit 58 in FIG. 1 which communicates between chamber 54 and its respective orifice 60 corresponds to the plurality of generally diagonally extending bores 126 (FIG. 5) extending within piston body 102. The bores 126 and the corresponding recess 124 thus provide open fluid communication between chamber 54 and the respective orifice 60. Referring to FIGS. 1 and 6, an entirely similar plurality of generally diagonally extending bores 128 extend within piston body 102 between the other recess 124 and chamber 52 to similarly provide open fluid communication between chamber 52 and the other orifice 60.

Referring to FIGS. 2 and 4, the orifice bypass conduits 72 and 74 with respective pressure relief valves 76 and 78 as shown in FIG. 2 correspond to the similar fluid flow paths with pressure relief valves 76 and 78 in FIG. 4. Each of pressure relief valves 76 and 78 includes a spring biasing element 130 (FIG. 4) which is retained by the respective orifice plate member 122 to bias a spherical relief valve element 132 into sealed, seated engagement with a seat 134 formed intermediate the open ends of respective, stepped through bores 136 which extend within piston body 102. These bores 136 communicate between the opposed recesses 124. Since the recesses 124 communicate openly with chambers 52 and 54 via passageways 128 and 126, respectively, any pressure differential between chambers 52 and 54 exceeding the relief pressure of valve 76 or 78 will open the respective valve 76 or 78 to permit fluid to flow between the chambers 52 and 54 through the open valve 76 or 78, thus bypassing the orifices 60.

Pressure differentials of any magnitude between chambers 52 and 54, whether or not they exceed the relief pressure of valves 76, 78, also will produce corresponding restricted flows through orifices 60 as hydraulic fluid passes from the higher pressure chamber 52 or 54 to the respective lower pressure chamber via passageways 126 and 128, the corresponding recesses 124 and orifices 60, interior piston rod space 112, and passages 114 which communicate between the portions of space 112 on opposite sides of the piston head member 102. The pressurized gas 70 contained within bladder 116 maintains essentially a constant pressure within space 112 owing to both the similarity of flow characteristics of the orifices 60, and the continuity of the pressure difference developed between chambers 52 and 54 upon movement of the piston head 38 in one axial direction or the other. Specifically, as noted hereinabove any axial impetus imparted to piston head 38 tends to increase the pressure in one of chambers 52 and 54, and decrease the pressure in the other by a like increment. Accordingly, the operation of the embodiment shown in FIGS. 3, 4, 5 and 6 is identical to the mode of operation described hereinabove with reference to FIG. 2.

The static state pressure to be maintained by gas 70 is preferably in the range of 100 psi to 600 psi, and particularly, approximately 250 psi. The relief pressure of valves 76 and 78 is preferably in the range of 50 psi to 300 psi, and more particularly, approximately 250 psi.

Figure 8:
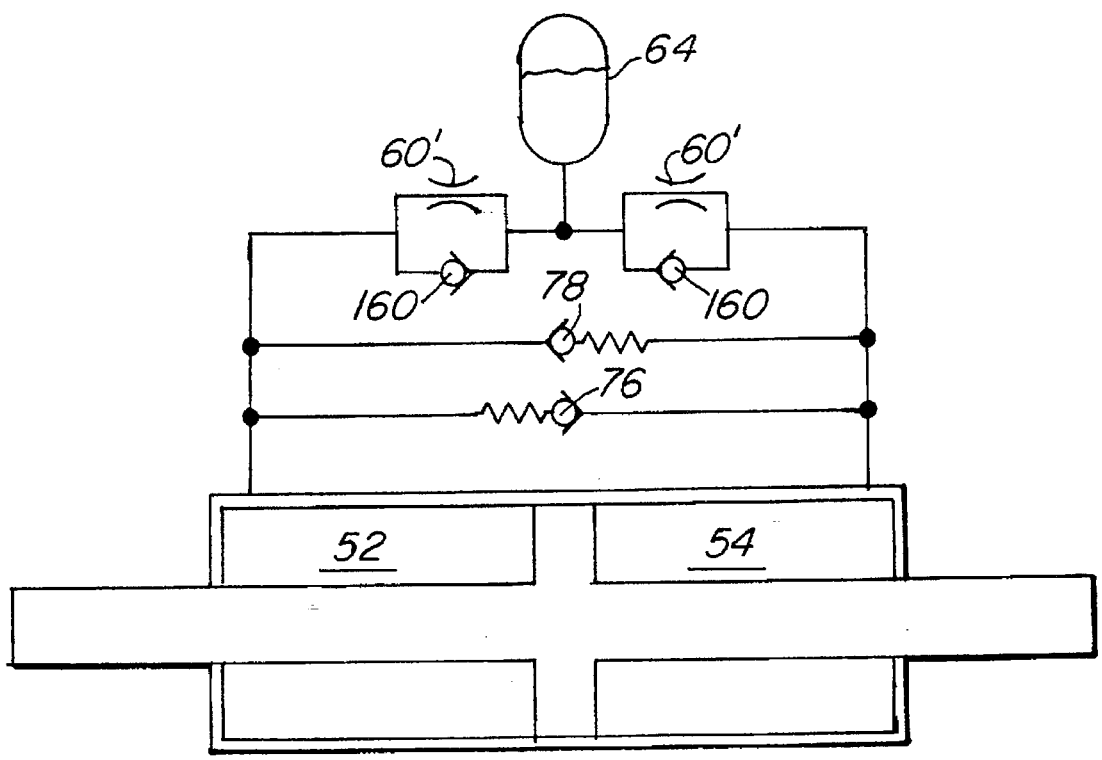
FIG. 8 is a schematic illustration of another preferred embodiment of the invention.
Figure 9:
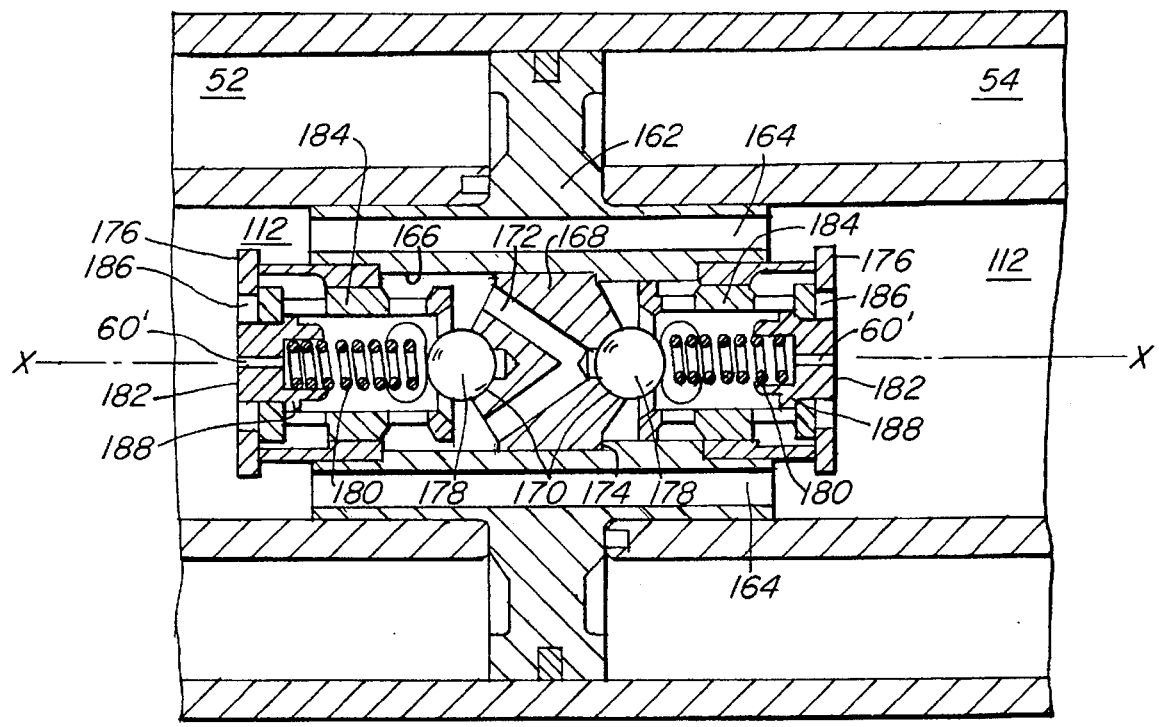
FIG. 9 is a sectioned side elevation of a fragmentary part of a damper showing a valving structure corresponding to the embodiment of FIG. 8.

FIGS. 8 and 9 illustrate an alternative preferred embodiment of the invention similar to that shown in FIGS. 2 and 3, but with additional features. Referring specifically to FIG. 8, the hydraulic damper is shown in an alternative embodiment which is operatively identical to the FIG. 2 embodiment except that each orifice 60' is connected in parallel with a check valve 160. The check valves 160 are arranged so that fluid flow between the chambers 52 and 54 passes through only one of the orifices 60'. That is, the flow from the higher pressure chamber 52 or 54 to the lower pressure one of these chambers will first flow through the respective orifice 60' as the corresponding check valve 160 is closed to flow in the direction from high pressure to low pressure. Flow that has passed through the first orifice 60' then encounters the downstream orifice 60' and check valve 160 arranged in parallel. This check valve 160, however, does accommodate fluid flow from the high pressure side to the low pressure side. Accordingly, the fluid flow will pass through the check valve 160 at essentially nil flow resistance, rather than through the second flow resisting orifice 60'.

As a result of this alternative structure, each orifice 60' must exhibit substantially increased fluid flow resistance, for example by being a much smaller diameter orifice, since a single orifice must now provide a flow resistance equivalent to that of two orifices arranged in series such as in the FIG. 2 embodiment. Among the benefits of the FIG. 8 embodiment is reduction or elimination of fluid cavitation on the low pressure side of the fluid flow circuit. The elimination of flow resistance across the orifice on the low pressure side permits the static pressure of the accumulator 64 to reach the lower pressure one of chambers 52 and 54 essentially without flow resistance, thereby diminishing or entirely eliminating the possibility that the fluid pressure in the lower pressure one of chambers 52 and 54 might become low enough to induce fluid cavitation. In this regard, the improvement of FIG. 8 may also permit elimination of the pressure relief valves 76 and 78 to provide yet another embodiment of the invention.

The check valves 160 could be incorporated in an embodiment already described hereinabove, for example by including the check valve as a parallel flow path together with orifices 60' through the respective members 122 (FIG. 4). In an alternative structural embodiment of the FIG. 8 circuit, as shown in FIG. 9, a piston body member 162 includes longitudinally extending through bores 164 for open communication between axially spaced portions 112 of an accumulator space substantially as set forth hereinabove with reference to FIG. 4. Body member 162 includes a further open through bore 166 which receives a relief valve body 168 having axially opposed relief valve seating surfaces 170 at longitudinally opposed sides thereof. The body 168 is received within bore 166 and retained intermediate the axial ends thereof, for example by engagement with a formed annular surface 174.

Each seating surface 170 forms an open port communicating with through passages 172, which thereby communicate between the opposed axial ends of the body 168. In FIG. 9 the passages 172 are shown as a pair of diverging passages extending between the right hand seating surface 170 and the opposed or left end of the body 168. In another plane preferably turned 90 degrees about axis X—X from the plane of FIG. 9, an entirely similar pair of diverging passageways (not shown) communicate from the left hand seating surface 170 to the opposed or right end of body 168.

An end closure element 176 is suitably received coaxially within each of the opposed axial ends of bore 166, for example by threaded engagement therein. Each end closure element 176 retains within the confines of bore 166 axially intermediate itself and the relief valve body 168 a relief valve ball element 178, a biasing spring 180, an orifice element 182, and a check valve element 184.

More specifically, each end closure element 176 includes one or more apertures 186 which are selectively opened or closed by axial movement of check valve element 184 into and out of engagement with an inner surface of the end closure element 176. In FIG. 9 the apertures 186 are shown closed.

The portion of each check valve element 184 which lies adjacent openings 186 also includes an axial through opening within which is received one of the orifice elements 182, each having an orifice 60' formed therein. A radially projecting flange portion 188 of each orifice element 182 engages the check valve element 184 for axial retention of the orifice element 182 with respect to check valve element 184. Each spring 180 is preferably an elongated coil spring which extends in biased engagement between one of the orifice elements 182 and the corresponding relief valve ball element 178. The springs 180 thus continuously urge the respective relief valve ball elements 178 axially into seated engagement with seating surfaces 170, and the combination of orifice elements 182 and check valve elements 184 in the opposed axial direction into engagement with the respective end closure elements 176, thereby closing the ports or apertures 186 as shown.

Of course, the interior of each check valve element 184 is of sufficiently open structure, and is provided with ports and flow channels as needed, to receive the springs 180 and relief valve ball elements 178 at least partially therein, and to permit fluid flow passing through either of the orifices 60' or the end closure port 186 to fill contiguous portions of bore 166. Fluid flow through orifices 60' and/or ports 186 thus can reach the respective relief valve flow passages 172, when open, essentially without restriction. From there, the fluid can pass through suitable passages provided in piston body member 162 (e.g. as shown at 126 and 128 in FIGS. 5 and 6) from the respective orifices 60' to the chambers 52 and 54.

Operation of the invention according to the FIG. 9 embodiment is essentially as described hereinabove with reference to FIGS. 3 to 6. In the following description, for purposes of illustration only, it will be assumed the piston is moving to the right in FIG. 9, and that chamber 54 is therefore at relatively higher pressure and chamber 52 is at relatively lower pressure. Of course, with the piston moving to the left, the operation is essentially the reverse of that described below.

Fluid flows from high pressure chamber 54 via suitable passages as above described into bore 166 to the left of relief valve body 168. The fluid flow proceeds thence through and about the adjacent check valve element 184 and through orifice 60' into accumulator space 112 within the left hand piston rod to the left of piston body 162. The flow thence proceeds via bores 164 into the axially opposed portion of accumulator space 112 in the right hand piston rod and exerts pressure against the right hand end closure member 176. The pressure on the opposite side of this end closure member 176 is lower because the contiguous space communicates with lower pressure chamber 52 as above described. With higher pressure outside the right hand closure member 176 and lower pressure inside, the differential fluid pressure overcomes the bias of spring 180 and moves the right hand check valve element 184 to the left, thereby opening check valve ports 186. Fluid thus flows freely through the check valve ports 186 into the right hand portion of bore 166, and thence to the low pressure chamber 52, essentially without encountering the flow resistance of the right hand orifice 60'.

The high pressure of fluid within the left hand portion of bore 166 also reaches the right hand relief valve ball element 178 via respective passages 172. If the high pressure is great enough to overcome the bias of the right hand spring 180, the high pressure fluid will lift relief valve ball element 178 and flow directly through the relief valve from the left side to the right side of relief valve element 168 thus bypassing both flow restricting orifices 60' in much the same manner as above described with reference to FIGS. 3 to 6. Also as described above, when a relief valve ball element 178 is lifted and fluid is flowing therethrough, the elevated pressure is also applied to the corresponding orifice 60', and thus imparts a flow impetus to force some fluid through the respective orifice 60'. Hydraulic restraint or resistance to relative yaw movement thus is realized even when a relief valve ball element 178 is lifted.

It is noted that the relief valve ball elements 178 and the corresponding check valve elements 184 are maintained in their closed positions by a common spring 180. Nevertheless, because the cross sectional area of check valve element 184 and orifice member 182 exposed to accumulator fluid pressure is relatively large, the fluid pressure differential required to open check valve ports 186 is correspondingly small. By contrast, the pressure required to lift relief valve ball elements 178 is considerably larger due to the very small cross sectional area of ball elements 178 that is exposed to elevated pressure. Accordingly, although retained by the same spring, the check valve elements 184 respond to a sufficiently small pressure loading that they can be regarded as non-biased check valve elements.

In accordance with the above description of the FIG. 9 embodiment, it will be seen that under normal operating conditions fluid flow from the higher pressure chamber 52 or 54 to the lower pressure one of these chambers will pass through only one of the orifices 60', and will bypass the other by instead flowing through the corresponding check valve port 186. Hence, a pressure drop below the static head pressure of accumulator space 112 in either of chambers 52 or 54 will not result in fluid cavitation. Even a relatively small pressure difference on opposed sides of either check valve element 184 will allow that check valve element to open the corresponding ports 186 and thereby immediately allow fluid flow access to the low pressure chamber 52 or 54, thus preventing fluid cavitation.

Figure 10:
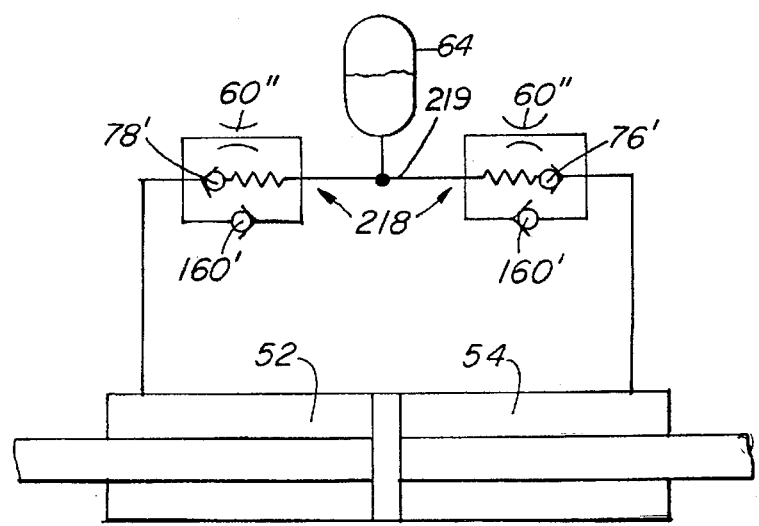
FIG. 10 is a schematic illustration of another preferred embodiment of the invention.
Figure 11:
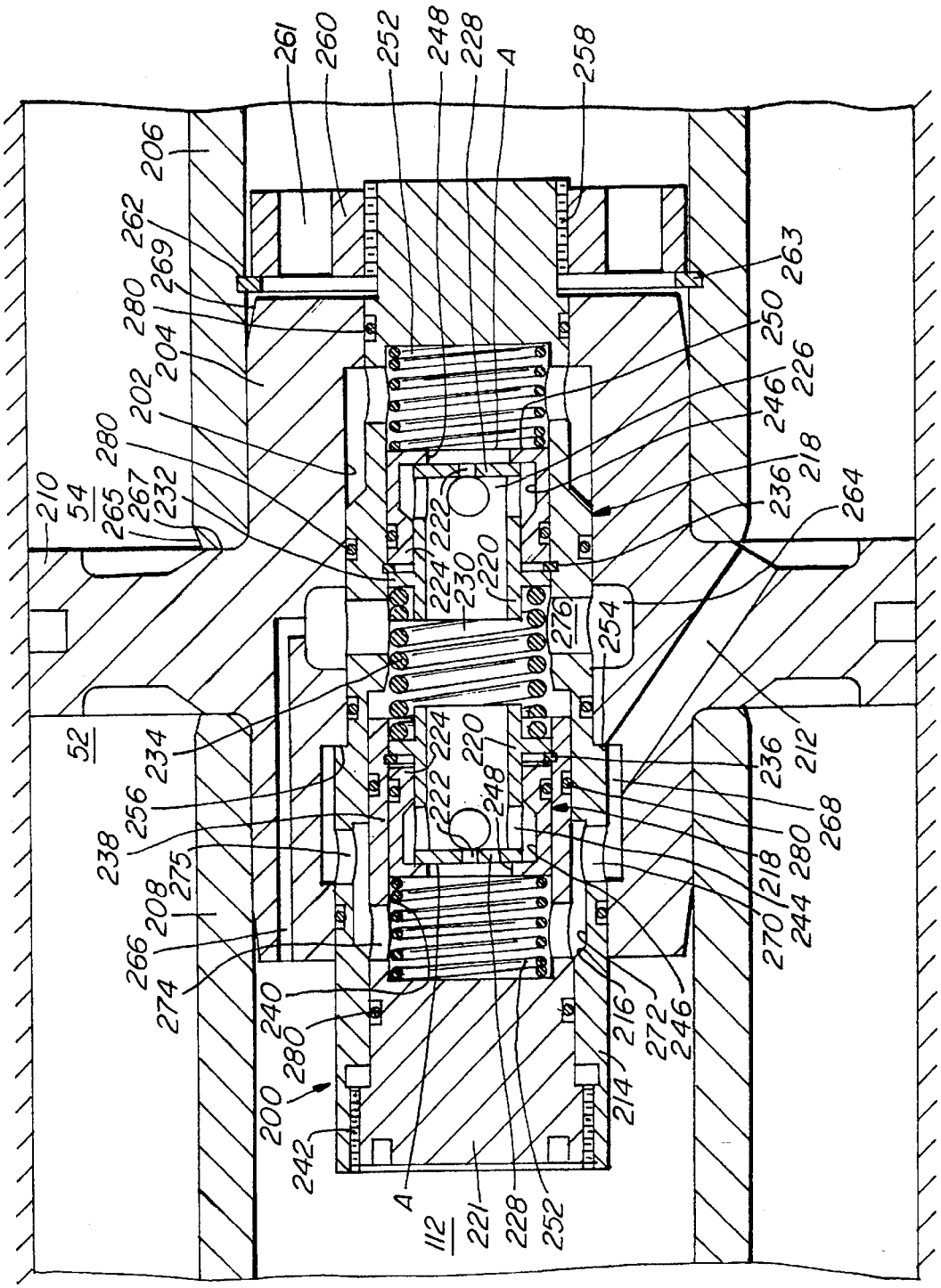
FIG. 11 is a sectioned side elevation of a fragmentary part of a piston assembly corresponding to the embodiment of FIG. 10.

FIGS. 10 and 11 illustrate another presently preferred embodiment of the invention. The FIG. 10 embodiment is similar in many salient respects to the FIG. 8 embodiment; however, in the FIG. 10 embodiment relief valves 76' and 78' are arranged individually in parallel with respective orifices 60" and check valves 160'. Thus, the FIG. 10 embodiment provides two sets of flow control devices 218, each consisting of an orifice 60", a relief valve 78' or 76' and a check valve 160'. Each set of elements 218 communicates at one side with a chamber 52 or 54, and at its other side with the other set of valve control elements 218. The fluid pressure generated by accumulator 64 is applied in the fluid flow passage 219 communicating between the two sets of fluid flow control elements 218.

The operative structure of FIG. 10 is embodied in a valving assembly shown in FIG. 11 as a self-contained valve assembly or cartridge 200 that is received in a stepped, axial through bore 202 formed in a piston body 204 which is assembled with piston rod elements 206 and 208. Axially intermediate the piston rod elements 206 and 208, a radially projecting piston head portion 210 is formed for axial sliding engagement within a fluid cylinder (not shown) that is similar in all salient respects to cylinder 26 of the FIG. 4. Fluid chambers 52 and 54 thus are formed on opposed sides of piston head 210.

The chambers 52 and 54 communicate with valving assembly 200 by way of fluid flow passages 212 formed in piston body 204 and openly communicating from the respective chambers 52 and 54, to opposed ends, respectively, of the valve assembly 200 within bore 202. In FIG. 11, only One of preferably a pair of flow passages 212 is shown communicating between chamber 54 and the left hand end of valve assembly 200 in a fashion similar to the structure shown in FIG. 5. An entirely similar pair of fluid flow passages (not shown) also communicates between chamber 52 and the right hand end of valve assembly 200, in a fashion similar to the structure shown in FIG. 6.

The valve assembly 200 comprises an elongated, generally stepped cylindrical housing 214 having formed therein a generally stepped, axially extending blind bore 216 which in turn receives two sets of flow control elements 218 and an end closure element 221 which also serves as a relief valve adjuster.

Each flow control assembly 218 comprises a relief valve body member 220, an orifice 222 formed in one axial end of each respective relief valve body 220, and a check valve element 224. Each relief valve body 220 is comprised of a rigid, generally cylindrical hollow member 226 having a closed, transverse end wall 228 that is penetrated by orifice 222. The opposed axial end 230 of each relief valve body 220 is open. An annular, radially projecting flange 232 of each relief valve body 220 provides an annular surface on which a compression spring 234 can bear, the compression spring 234 thus extending between the pair of opposed relief valve elements 220 and continuously urging them in opposed axial directions. Movement of relief valve body elements 220 in such opposed axial directions is limited by engagement of the flanges 232 on respective snap rings 236, one of which is carried by valve housing 214 and the other by the end closure element 221 received therein.

More specifically, end closure element 221 includes an axially extending portion 238 which projects axially into the open end of bore 216. The axially projecting portion 238 defines a blind bore 240 formed therein to receive one set of flow control elements 218, whereas the other set of flow control elements 218 is received within valve housing 214 at a location spaced axially from end closure element 221. The end closure element 221 is threadedly engaged within body 214 as at 242 to thereby permit axial adjustment of end closure element 221 with respect to valve housing 214. Accordingly, as the snap rings 236 are carried, respectively, by valve housing 214 and end closure element 221, the axial spacing between the snap rings 236 can be adjusted at will by turning end closure element 221 in threaded engagement with valve housing 214. Since snap rings 236 retain flanges 232, which in turn retain the ends of spring 234, the compression of spring 234 is also adjusted. Further, Since the compressive force of spring 234 is the force which either relief valve member 220 must overcome before it can open, the threaded adjustment of end closure member 221 with respect to valve housing 214 permits adjustment of the relief valve set pressure through incremental adjustment of the compression of spring 234.

Encompassing each relief valve element 220 is one of the check valve elements 224. Each check valve element 224 comprises a generally cylindrical, hollow body member having a stepped, axial through bore 244 which receives a respective one of relief valve elements 220 in coaxial, slidable relationship. The bore 244 includes an enlarged portion 246, and a reduced diameter portion 248 which is of smaller diameter than the adjacent transverse end wall 228 of the corresponding relief valve element 220. Accordingly, the end wall 228 of each relief valve element 220 is engagable in seated engagement as indicated at 250 with one of check valve elements 224. Each check valve element 224 is maintained in seated engagement with end wall 228 of the respective relief valve element 220 by a coil spring 252. One coil spring 252 extends between the blind end of bore 2216 in valve housing 214 and the respective check valve element 224. The other spring 252 extends between the blind end of bore 240 in end closure element 221 and the other check valve element 224. The reduced diameter bore portion 248 constitutes both a check valve port and a relief valve port. When opened by axial sliding of check valve element 224 with respect to relief valve element 220, due to consequent compression of spring 252 the assembly acts as a check valve, allowing the fluid pressure of accumulator space 112 to pass through one of the reduced diameter bore portions 248 and thereby reach the low pressure one of chambers 52 and 54. When opened by relative axial sliding of relief valve element 220 with respect to check valve element 224, due to consequent compression of spring 234 the assembly acts as a relief valve, thus allowing fluid flow to bypass orifice 222 and instead flow via bore portion 248 and enlarged bore portion 246, and thence through the interior of both relief valve elements 220 to the check valve in the opposed flow control assembly 218.

Both of check valve elements 224 are located entirely to the opposite axial side of snap rings 236 from the respective relief valve element flanges 232 so that the snap rings 236 also function to limit axial movement of the check valve elements 224.

The entire valve assembly cartridge 200 is received in piston body 204 by axial insertion thereof into bore 202 until an annular surface portion 254 of the cartridge housing 214 engages a corresponding annular surface 256 of bore 202. A threaded axial end portion 258 of cartridge body 214 projects axially outward of bore 202 and beyond the end of piston body 204. A retention nut 260 is engaged thereon to secure the valve cartridge assembly 200 within piston body bore 202.

The retention nut 260 may preferably cooperate with a snap ring 262 carried by a piston rod element 206 which is received in encompassing relationship about one axial end of piston body 204. Specifically, snap ring 262 is disposed in an annular groove 263 formed in piston rod 206 at a location suitably spaced from an adjacent end 265 of piston rod 206. With piston rod end 265 in abutting engagement with a flank surface 267 of the piston head portion 210, snap ring 262 is spaced slightly from piston body 204 thus leaving an axial gap therebetween such as indicated at 269. Accordingly, the nut 260 not only retains cartridge 200 within bore 202 of piston body 204, it also can securely retain a piston rod member with respect to the piston body 204. An entirely similar nut may engage suitable threads on the opposed axial end of cartridge 200 to cooperate with a similar snap ring for retaining the axially opposed piston rod 208 with respect to piston body 204.

As has been noted with reference to FIG. 10, accumulator 64 communicates with a fluid flow space or passage 219 between the described pair of flow control assemblies 218. The corresponding structure in FIG. 11 comprises an annular enlargement 264 of bore 202 which communicates with the interior space 112 of one piston rod only, for example piston rod element 208, via a passage 266 formed in the piston body 204. Since, as noted above, it is desirable to minimize accumulator volume consistent with operating requirements of the described hydraulic damper, this embodiment uses interior piston rod space only to one side of piston body 204.

As may be appreciated, the embodiment of FIG. 11 provides for a unitized, cartridge assembly which encloses within the confines of the piston body 204 all of the flow control functions of the described hydraulic damper, including all flow resisting orifices, pressure relief and check valve functions. The operation and method of this embodiment will be better understood from the following description.

When an impetus imparted to the hydraulic damper urges piston head 210 to move axially, for example to the right, with respect to the cylinder spaces 52 and 54, a pressure increase develops in chamber 54 and a corresponding pressure decrease develops in chamber 52. The increased pressure in chamber 54 is transmitted through flow path 212 and a connected annular undercut portion 268 of bore 202, and thence through a communicating port 270 in housing 214, an undercut portion 272 of bore 216 therein, and a communicating port 274 in end closure member 221 to the bore 240 in end closure member 221. The high pressure thus acts on the exposed end surface area A of the check valve and relief valve assembly elements 220 and 224.

The elevated pressure forces fluid flow through orifice 222, there being a corresponding pressure drop due to the flow restriction of orifice 222. Once having passed through the orifice 222, the fluid is subjected to accumulator pressure which is supplied continuously from piston rod interior space 112 by way of fluid flow passage 266, annular enlargement 264 and a communicating port 276 into bore 216. As will be appreciated, for purposes of the present example fluid flow is generally from left to right in the flow control valving assemblies 218 described. Thus the fluid flow, having passed through the orifice 222 of the left hand assembly 218, flowing in the left-to-right direction, proceeds into the right hand flow control assembly 218. There, reduced or diminished fluid pressure of chamber 52 is acting on the corresponding surface areas A of the flow control assembly, and the higher internal fluid pressure acts on the opposed surfaces from within the flow control assembly. Most notably, the higher fluid pressure reaches check valve surface area A' via ports 274. The consequent pressure differential applied to check valve element 224 overcomes the very light spring loading of spring 252 thereby allowing fluid flow to bypass the right hand orifice 222 and proceed by way of the open check valve port 248 to chamber 52.

If the high pressure in chamber 54 is sufficient to actuate the corresponding relief valve, the action of the pressure on area A will overcome the bias of spring 234 and displace the left hand one of relief valve elements 220 to the right, thereby opening the relief valve port 248 and allowing fluid to flow through bore portion 246 and respective communicating ports 275 thus bypassing the adjacent orifice 222.

For emphasis, it will be noted again that the described check valve and relief valve elements operate in a mutually cooperable manner, utilizing a single port for both the flow checking and pressure relief functions, depending upon the direction of fluid flow, or more particularly the direction and magnitude of the pressure differential across the respective flow control assemblies 218. When the pressure applied to the cross sectional area A is greater than accumulator pressure, the pressure differential will force fluid through the corresponding orifice 222. If the pressure is of sufficient magnitude, it will also open the relief valve by compressing spring 234 and moving the relief valve element 220 axially to disengage the seated surfaces at 250. When the pressure applied to cross sectional area A is less than accumulator pressure, the relief valve element will remain in biased engagement with the respective snap ring 236, and under the impetus of higher pressure on the opposed side of area A, the check valve element 224 will move axially against the bias of spring 252 to disengage the surfaces seated at 250. Accordingly, two entirely different valve functions are achieved in a single pair of valving elements with a single flow port configuration.

Of course, in order to achieve proper flow control as above described, the apparatus of FIG. 11 also contemplates suitable seals such as 0-ring seals indicated at 280 and elsewhere as shown to confine fluid flow to the flow paths described.

In particular, since the invention is intended to provide yaw restraint of a desired, effective magnitude, and since the perception of what may constitute an effective magnitude of restraint may differ among practitioners of the art, the gas pressures specified hereinabove are examples only. Actual gas pressure will be selected with reference to the overall design of a particular hydraulic yaw damper apparatus in accordance with this invention, taking into account a variety of design factors, and most notably the effective piston areas on which the accumulator gas pressure would act.

Furthermore, it is noted that while the accumulator space 112 of the FIG. 11 embodiment may be provided in either of the piston rods 206 or 208, providing the accumulator space in the same piston rod as that through which one would have access to adjustment nut 221 as shown in FIG. 11 may unnecessarily complicate yaw damper operation. One would have to depressurize the accumulator space 112 in order to gain access to adjusting nut 221, and would thereafter have to re-pressurize accumulator space 112. To avoid this complication, adjustment nut 221 may be accessed through an end of one of piston rods 206, 208, and accumulator space 112 may be provided within the confines of the other of piston rods 206, 208. In the FIG. 11 embodiment specifically, to accommodate this modification the space within the confines of piston rod 206 would be pressurized with accumulator pressure, and passage 266 would communicate through the piston body member from bore enlargement 264 to the interior of piston rod 206. Suitable through openings in nut 260 such as shown at 261 would accommodate gas flow between the interior of piston rod 206 and passage 266.

Figure 12:
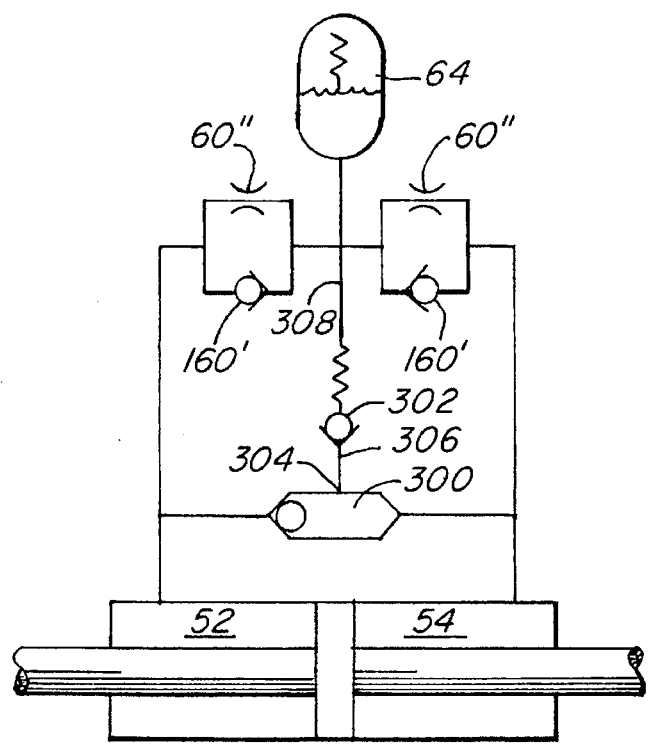
FIG. 12 is a schematic illustration of another embodiment of the invention.
Figure 13:
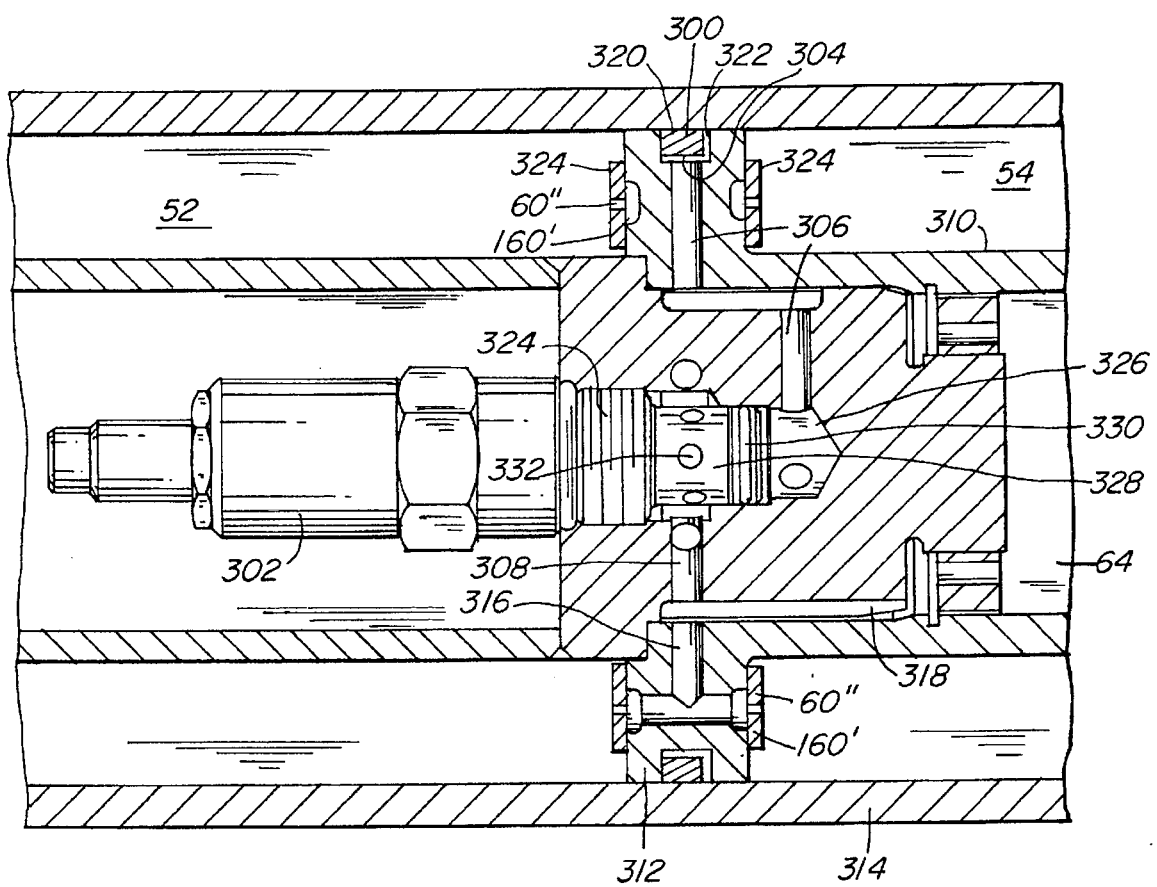
FIG. 13 is a sectioned side elevation of a fragmentary part of a piston and cylinder assembly corresponding to the embodiment FIG. 12.

FIGS. 12 and 13 illustrate another presently preferred embodiment of the invention. The FIG. 12 embodiment is similar in many salient respects to the FIGS. 8 and 10 embodiments; however, in the FIG. 12 embodiment the pressure relief valving is modified from the configuration shown in FIGS. 8 and 10.

FIG. 12 shows the accumulator 64, the chambers 52 and 54, the orifices 60" and check valves 160', together with the respective fluid connections therebetween as disclosed in FIGS. 8 and 10, and described hereinabove. In the FIG. 12 embodiment, however, a shuttle or two-way check valve 300 communicates between the fluid flow passages which convey fluid and pressure from chambers 52 and 54 to the flow control elements 60" and 160'. A center port 304 of check valve 300 has a fluid flow conduit 306 connected thereto whereby the center port 304 communicates with an inlet port of a pressure relief valve 302. The outlet of pressure relief valve 302 is connected to accumulator 64 in common with the connection thereto of orifices 60" and check valves 160' as by a conduit 308.

The FIG. 12 embodiment operates as follows. When the piston moves, to the right for example, the volume of chamber 54 decreases and the volume of chamber 52 increases. The resulting fluid pressure increase in chamber 54, and the corresponding pressure decrease in chamber 52 actuates valve 300 as shown in FIG. 12 so that the increased fluid pressure of chamber 54 reaches relief valve 302 via port 304 and conduit 306. The increased fluid pressure also reaches the corresponding orifice 60" and check valve 160' as in other embodiments described hereinabove. If movement of the piston is slow enough that the resulting pressure differential between chambers 54 and 52, acting through the circuitry as shown, does not open valve 302, fluid will flow through orifice 60" on the high pressure side and check valve 160' on the low pressure side until the pressure in chambers 52 and 54 is equalized at the pressure of accumulator 64.

When the piston movement creates a pressure differential in chambers 52 and 54 sufficient to open valve 302, fluid flows at a greater rate from the high pressure side to the low pressure side through both the orifice 60" on the high pressure side and valve 302. Accordingly, the FIG. 12 embodiment provides for normal low velocity relative yawing of a truck with respect to a car body, damping of higher velocity yawing movements, and a bypass circuit with pressure relief valving which limits the maximum restraining force that can be evolved to resist truck-to-car body relative yaw movements. As with other described embodiments, the FIG. 12 embodiment offers the attendant benefits of diminished likelihood of fluid cavitation, also as described hereinabove with reference to other embodiments.

The FIG. 12 schematic structure is embodied in the apparatus of FIG. 13 as a piston 310 having a head portion 312 slidably disposed within a cylinder 314 to define variable volume chambers 52 and 54. Accumulator 64 is defined by a space within one rod portion of piston 310 as above described.

Chambers 52 and 54 communicate via orifices 60" and check valves 160' with accumulator 64 via passages 316 and 318. Through the connection in common between these passages and passage 308, chambers 52 and 54 also communicate with the outlet side of pressure relief valve 302. Shuttle check valve 300 has its port 304 connected to a conduit or passage 306 for communication with the inlet side of pressure relief valve 302.

In the FIG. 13 apparatus, shuttle valve 300 takes the form of a ring seal element 320 disposed within an annular groove 322 formed in piston head 312, the ring 320 being so dimensioned with respect to groove 322 as to be slidable longitudinally therein between extreme longitudinal positions. Longitudinal movement of piston 310 serves to position ring 320 always in a rearward or trailing position within groove 322, with respect to the direction of piston movement. The resulting gap at the leading end of groove 322 provides a passageway or flow path for controlled fluid flow from the higher pressure chamber 52 or 54, between piston head 312 and cylinder 314, around seal ring 320, and thence via passage 306 to the inlet side of valve 302. Shuttle check valve 300 operates in the same way with movement of piston 310 in either axial direction within cylinder 314.

The orifices 60" and check valves 160' are combined in a structure comprising a pair of annular valve plates 324 which are carried adjacent the opposed faces of piston head 312 by such suitable means as tension springs (not shown) extending through suitable openings (not shown) in piston head 312 and connected to the respective plates 324 to urge plates 324 into lightly biased engagement with the respective faces of piston head 312. Accordingly, when the force of fluid pressure in passages 316, which are open to plates 324 preferably at multiple locations about the circumference of piston head 312 via annular grooves 317, exceeds the force of pressure in the corresponding chamber 52 or 54 and overcomes the light spring retention biasing of the respective plate 324 toward the piston head 312, the plate 324 will lift to allow free flow of fluid from the respective groove 317 into the respective chamber 52 or 54. This may be flow from either the corresponding opposed orifices 60", flow through valve 302, or a combination of both as above described with reference to other embodiments.

The orifices 60" are formed as through openings in plates 324 such that when the fluid pressure in one of chambers 52 or 54 is increased, the respective plate 324 is maintained by the increased bias of the elevated pressure in engagement with the respective face of piston head 312, and fluid flow passes through the orifices 60" and the corresponding check valve 160' from the higher pressure chamber 52 or 54 to the lower pressure chamber.

The valve 302 may be any suitable relief valve assembly, for example a Vickers RV 5-10-5-0-20 relief valve. The valve 302 includes threads 324 by which it is engaged within a stepped, blind bore 326 formed in the piston. A ported valving portion 328 of valve 302 extends within bore 326 and sealingly engages bore 326 by means of a suitable seal, for example an o-ring seal such as indicated at 330.

Valving portion 328 includes ports 332 on one side of seal 330 which communicate with passage 308, and other suitable ports (not shown) on the other side of seal 330 which communicate with passage 306. A spring loaded pressure relief valve port (not shown) is disposed within valve 302 intermediate the respective ports opening to passages 308 and 306 to provide a pressure relief capability for fluid flowing from the higher pressure chamber 52 or 54 via shuttle valve 300 and passages 306 to the lower pressure chamber 52 or 54, as above described.

Figure 14:
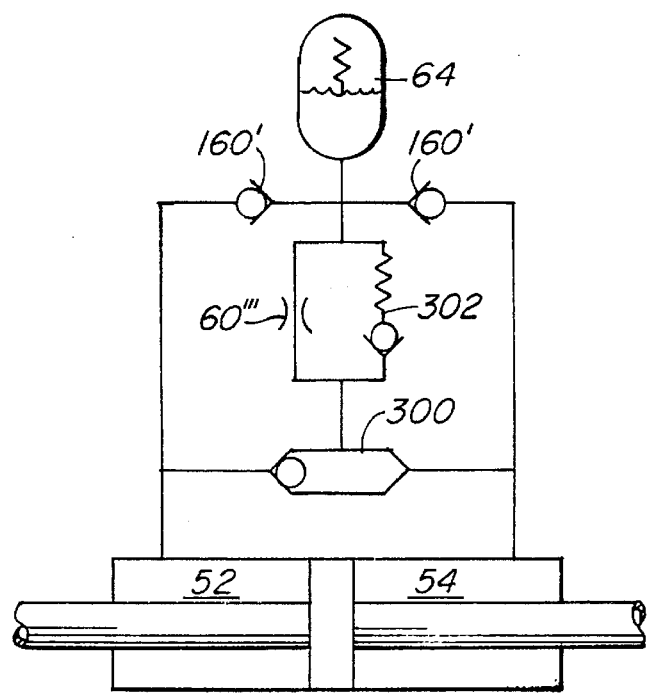
FIG. 14 is a schematic illustration of a modified version of the embodiment of FIG. 12.

A modification of the FIG. 12 embodiment is shown schematically in FIG. 14, the modification being that the orifices 60" are replaced by a single orifice 60'" disposed in parallel with pressure relief valve 302 rather than having a flow orifice disposed in parallel with each of the check valves 160'. The function of the FIG. 14 modified embodiment is essentially the same as the FIG. 12 embodiment, except that the flow path of fluid flowing from one of chambers 52 or 54 to the other is always flow via the shuttle valve 300 whereas in the FIG. 12 embodiment the flow orifice flow path bypasses the shuttle valve 300.

The above description discloses certain presently preferred embodiments of the invention and is intended to fulfill requirements for disclosure of the best mode of the invention. It is not an exhaustive disclosure of all possible embodiments, and certainly others skilled in the art could conceive other alternative and modified embodiments, once they were apprised of our invention. Accordingly, we intend that the invention should be construed broadly and limited only by the scope of the claims appended hereto.

We claim:

1. In a fluid flow regulating apparatus for controlling a flow of fluid between a pair of fluid containing spaces which are connected by a fluid flow path, said fluid flow regulating apparatus comprising:

a pair of flow regulating assemblies adapted to be disposed in series relationship with respect to each other in such a fluid flow path with each said flow regulating assembly forming a part of such a fluid flow path;

each said flow regulating assembly having a restricted flow orifice means adapted to restrict fluid flow through such a fluid flow path between such fluid containing spaces;

each said flow regulating assembly further having check valve means adapted to limit unrestricted fluid flow within the respective said flow regulating assembly to flow in only one direction;

pressure relief means adapted to relieve the pressure of fluid within such a fluid flow path between such fluid containing spaces when the pressure differential between such fluid containing spaces exceeds a given pressure;

and said pressure relief means comprising a single relief valve means communicating in fluid pressure relief relation between such pair of fluid containing spaces and such fluid flow path intermediate said pair of flow regulating assemblies.

2. The apparatus as set forth in claim 1 additionally including fluid pressure accumulator means adapted to communicate with such a fluid flow path intermediate said flow regulating assemblies.

3. In a fluid flow regulating apparatus for controlling a flow of fluid between a pair of fluid containing spaces defined on axially opposed sides of a piston which is slidably disposed within a cylinder, and which spaces are connected by a fluid flow path, said fluid flow regulating apparatus being carried entirely by said piston and comprising:

a pair of flow regulating assemblies adapted to be disposed in series relationship with respect to each other in such a fluid flow path with each said flow regulating assembly forming a part of such a fluid flow path;

each said flow regulating assembly having a restricted flow orifice means adapted to restrict fluid flow through such a fluid flow path between such fluid containing spaces;

each said flow regulating assembly further having check valve means adapted to limit unrestricted fluid flow within the respective said flow regulating assembly to flow in only one direction; and pressure relief means adapted to relieve the pressure of fluid within such a fluid flow path between such fluid containing spaces when the pressure differential between such fluid containing spaces exceeds a given pressure.

4. The apparatus as set forth in claim 3 wherein said pressure relief means is comprised of a single relief valve means communicating in fluid pressure relief relation between such a pair of fluid containing spaces and such fluid flow path intermediate said pair of flow regulating assemblies.

5. The apparatus as set forth in claim 3 additionally including fluid pressure accumulator means adapted to communicate with such a fluid flow path intermediate said flow regulating assemblies.

6. The apparatus as set forth in claim 3 wherein said pressure relief means and said check valve means of at least one of said flow regulating assemblies consists of a member having a generally cylindrical bore and a pair of mutually cooperable cylindrical elements which are coaxially disposed within said cylindrical bore and are axially movable therein into and out of mutual engagement, and biasing means operable to continuously urge said cylindrical elements into biased engagement with each other.

7. The apparatus as set forth in claim 6 wherein said pair of cylindrical elements includes a respective pair of mutually engagable valve seating surfaces which allow fluid flow to pass when disengaged and which block fluid flow when engaged in a manner that the engagement and disengagement of said pair of valve seating surfaces provides both the pressure relief of said pressure relief means and the limit on unrestricted flow of said check valve means.

8. The apparatus as set forth in claim 6 wherein one of said cylindrical elements includes said restricted flow orifice.

9. The apparatus as set forth in claim 7 wherein one of said cylindrical elements includes said restricted flow orifice.

10. The apparatus as set forth in claim 3 wherein said orifice means and said check valve means of at least one of said flow regulating assemblies consists of an annular member encompassing said piston and being cooperable with portions of such fluid flow path formed in a head portion of said piston to regulate fluid flow within such fluid flow path.

11. The apparatus as set forth in claim 3 wherein said pressure relief means comprises a self-contained relief valve assembly which is selectively releasably carried by said piston.

* * * * *